United States Patent
Ma et al.

(10) Patent No.: US 12,328,174 B2
(45) Date of Patent: Jun. 10, 2025

(54) SELECTION OF ANTENNA PATTERNS BASED ON IMAGE DATA AND DEPTH DATA

(71) Applicant: HEWLETT-PACKARD DEVELOPMENT COMPANY, L.P., Spring, TX (US)

(72) Inventors: Chin-Hung Ma, Taipei (TW); Huai-yung Yen, Taipei (TW); Kun-Jung Wu, Taipei (TW); Xin-Chang Chen, Taipei (TW); Hsiao Chun Su, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 545 days.

(21) Appl. No.: 17/880,266

(22) Filed: Aug. 3, 2022

(65) Prior Publication Data
US 2024/0048218 A1 Feb. 8, 2024

(51) Int. Cl.
*H04B 7/08* (2006.01)
*G06T 7/70* (2017.01)
*H04B 7/06* (2006.01)

(52) U.S. Cl.
CPC ............. *H04B 7/0834* (2013.01); *G06T 7/70* (2017.01); *H04B 7/0608* (2013.01)

(58) Field of Classification Search
CPC ........ H04B 7/0834; H04B 7/0608; G06T 7/70
See application file for complete search history.

(56) References Cited

U.S. PATENT DOCUMENTS

| | | | | |
|---|---|---|---|---|
| 9,395,727 | B1 * | 7/2016 | Smith | G01S 7/03 |
| 11,057,751 | B1 * | 7/2021 | Niranjayan | G06Q 30/06 |
| 11,522,290 | B1 * | 12/2022 | Ma | H01Q 1/2283 |
| 11,715,301 | B2 * | 8/2023 | Bai | G02B 27/017 |
| | | | | 345/633 |
| 2022/0046447 | A1 * | 2/2022 | Pedersen | H04W 24/08 |
| 2022/0225118 | A1 * | 7/2022 | Pefkianakis | H04W 64/006 |
| 2022/0407574 | A1 * | 12/2022 | Goto | H04B 7/0691 |
| 2024/0283504 | A1 * | 8/2024 | Ge | H04B 7/0608 |

OTHER PUBLICATIONS

Ma, Yuchen et al., An Image Aware Based Smart Antenna Capable of Automatic Beam Switching for Indoor Mobile Communication, Dec. 23, 2019, IEEE Access vol. 8, pp. 379-388 (Year: 2019).*

* cited by examiner

*Primary Examiner* — Lewis G West
(74) *Attorney, Agent, or Firm* — Knobbe, Martens, Olson & Bear, LLP

(57) ABSTRACT

An example mobile computing device includes: an antenna capable of switching between a plurality of antenna patterns; an image sensor to capture image data representing an environment of the mobile computing device; a depth sensor to capture depth data representing the environment of the mobile computing device; a processor connected to the antenna, the image sensor and the depth sensor, the processor to: obtain the image data and the depth data; select a designated antenna pattern from the plurality of antenna patterns based on the image data and the depth data; and control the antenna to use the designated antenna pattern.

15 Claims, 5 Drawing Sheets

SELECTION OF ANTENNA PATTERNS BASED ON IMAGE DATA AND DEPTH DATA

BACKGROUND

Mobile computing devices use antennas for wireless communications. Some antennas may be capable of generating multiple radiation patterns to improve the potential reception and transmission signal strength.

DETAILED DESCRIPTION

To optimize the signal strength for wireless communications, mobile computing devices with dynamic antennas (i.e., antennas capable of switching between multiple antenna patterns), the devices may iterate through each of the antenna patterns of the dynamic antenna to identify the optimal antenna pattern. However, the iteration and obtention of performance data for each antenna pattern can be time-consuming. When a user is moving the mobile computing device, this can result in the selection of an antenna pattern which is no longer optimal if the device's location at the end of the evaluation is different from the device's location at the start of the evaluation.

An example mobile computing device with an antenna capable of switching between a plurality of antenna patterns can use image data and depth data to select an initial designated antenna pattern and use that antenna pattern. In particular, the designated antenna pattern may represent a historically optimal antenna pattern based on similar image data and depth data captured. Thus, the mobile computing device may quickly switch between antenna patterns based on historically optimal antenna patterns and based on captured image data and depth data, in particular when a user is moving the mobile device. The device may also re-evaluate antenna performance to determine if a new antenna pattern should be associated with the location of the mobile device and/or the image and depth data captured, for example by iterating through the antenna patterns and capturing performance data. Thus, the mobile computing device can select an antenna pattern known to perform well at a given location, without a wait time to evaluate each of the antenna patterns, while still allowing for subsequent reassessment of the antenna patterns.

Figure 1:
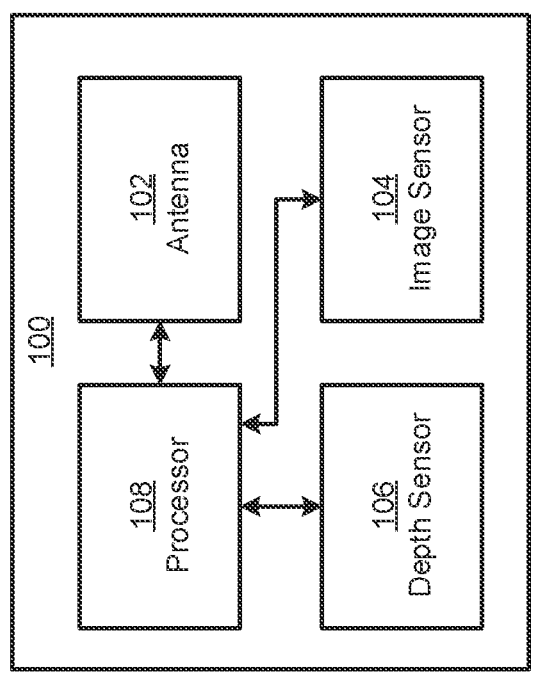
FIG. 1 is a block diagram of an example device to select antenna patterns based on image data and depth data.

FIG. 1 shows a schematic block diagram of an example mobile computing device 100 capable of selecting antenna patterns based on image data and depth data. The mobile computing device 100 may be, for example, a laptop computer, a tablet, a smart phone or suitable other mobile computing device. The mobile computing device 100 (also referred to herein as computing device 100 or simply device 100) includes an antenna 102, an image sensor 104, a depth sensor 106, and a processor 108.

The antenna 102 is generally to provide wireless communications capabilities for the device 100. For example, the antenna 102 may be to connect to a wireless local area network, or similar. The antenna 102 is capable of switching between a plurality of antenna patterns. That is, the antenna 102 may dynamically generate two or more radiation patterns (i.e., antenna patterns) using the same physical structure of the antenna 102. The antenna 102 may therefore include suitable hardware and control components allowing the antenna 102 to switch between the antenna patterns. In some examples, the antenna 102 may have an integrated controller (not shown) to control the generation of the antenna patterns. Each antenna pattern may provide the antenna 102 and the mobile computing device 100 with different signal reception based on the receipt of radio waves at the antenna pattern. The antenna 102 may therefore also be referred to as a dynamic steering antenna, since the antenna 102 may be dynamically controlled (or steered) to employ a different pattern at a given location to improve a received signal.

The image sensor 104 is to capture image data representing an environment of the mobile computing device 100. For example, the image sensor 104 may be an optical camera, an infrared camera, or other suitable imaging device.

The depth sensor 106 is to capture depth data representing the environment of the mobile computing device 100. For example, the depth sensor 106 may be a light detection and ranging (LI DAR) device, a stereo camera system, another time-of-flight based system, or other suitable depth sensor.

The processor 108 is interconnected with the antenna 102, the image sensor 104, and the depth sensor 106. The processor 108 may be a microcontroller, a microprocessor, a processing core, or similar device capable of executing instructions. The processor 108 may also include or be interconnected with a non-transitory machine-readable storage medium that may be electronic, magnetic, optical or other physical storage device that stores executable instructions allowing the processor 108 to perform the functions described herein. In particular, the instructions may cause the processor 108 to obtain image data and depth data from the image sensor 104 and the depth sensor 106, respectively, select a designated antenna pattern from the plurality of antenna patterns based on the image data and depth data, and control the antenna 102 to use the designated antenna pattern.

Figure 2:
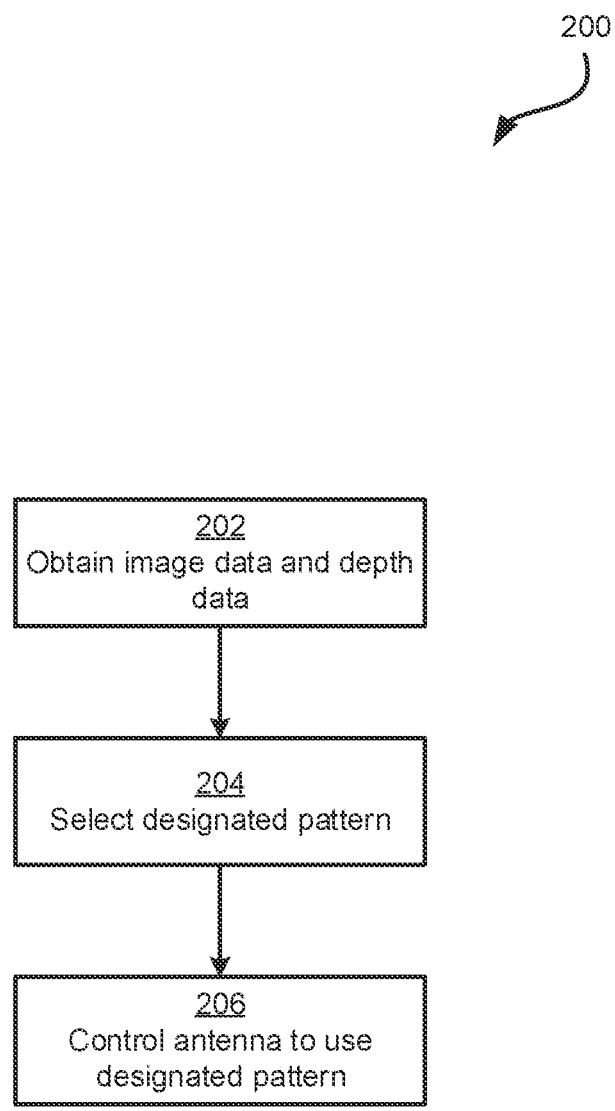
FIG. 2 is a flowchart of an example method of selecting antenna patterns based on image data and depth data.

For example, referring to FIG. 2, an example method 200 to select antenna patterns based on image data and depth data is depicted. The method 200 will be described below in conjunction with its performance in the mobile computing device 100, and in particular by the processor 108. In other examples, the method 200 may be performed by other suitable devices or systems.

At block 202, the processor 108 obtains image data and depth data from the image sensor 104 and the depth sensor 106, respectively. Block 202 may be initiated in response to a triggering event. For example, the triggering event may be a request for connection to a new wireless network, which may occur via manual user input, or detection of the new wireless network after being disconnected from any networks, or similar. The triggering event may also be a detection of a change in location of the device 100, for example within the coverage area of a connected access point. For example, the device 100 may include an internal measurement unit, accelerometer or other device to track movement of the device 100. The device 100 may additionally periodically activate the image sensor 104 and the depth sensor 106 to determine the location of the device 100 and hence determine a change in location. In some examples, the change in location may be quantified (e.g., to determine an amount of change) and compared to a threshold distance or amount of movement to trigger initiation of selection of an antenna pattern. In other examples, the triggering event may be a detection of a change in signal strength to a connected access point. For example, the change may be compared to a threshold signal strength, below which the processor 108 may initiate selection of a new antenna pattern. In still further examples, the processor 108 may periodically repeat the method 200.

In some examples, to obtain the image data and the depth data, the processor 108 may actively control the image sensor 104 and the depth sensor 106 to capture the image data and the depth data representing the environment of the device 100. The processor 108 may control the image sensor 104 and the depth sensor 106 to capture data automatically, based on the triggering event, or the processor 108 may initiate a user for user-assisted capture. For example, the processor 108 may provide a prompt on a display of the device 100 for the user to move or rotate the device 100 to capture a sufficient portion of the environment to determine the location of the device 100 based on the captured image and depth data.

At block 204, the processor 108 selects a designated antenna pattern from the plurality of antenna patterns based on the image data and the depth data captured at block 202. In some examples, the processor 108 may implement an artificial intelligence engine to select the designated antenna pattern based on the image data and the depth data. The processor 108 may determine an antenna pattern associated with the image data and the depth data directly, or the processor 108 may identify a location associated with the image data and the depth data and select an antenna pattern associated with the location.

Figure 3:
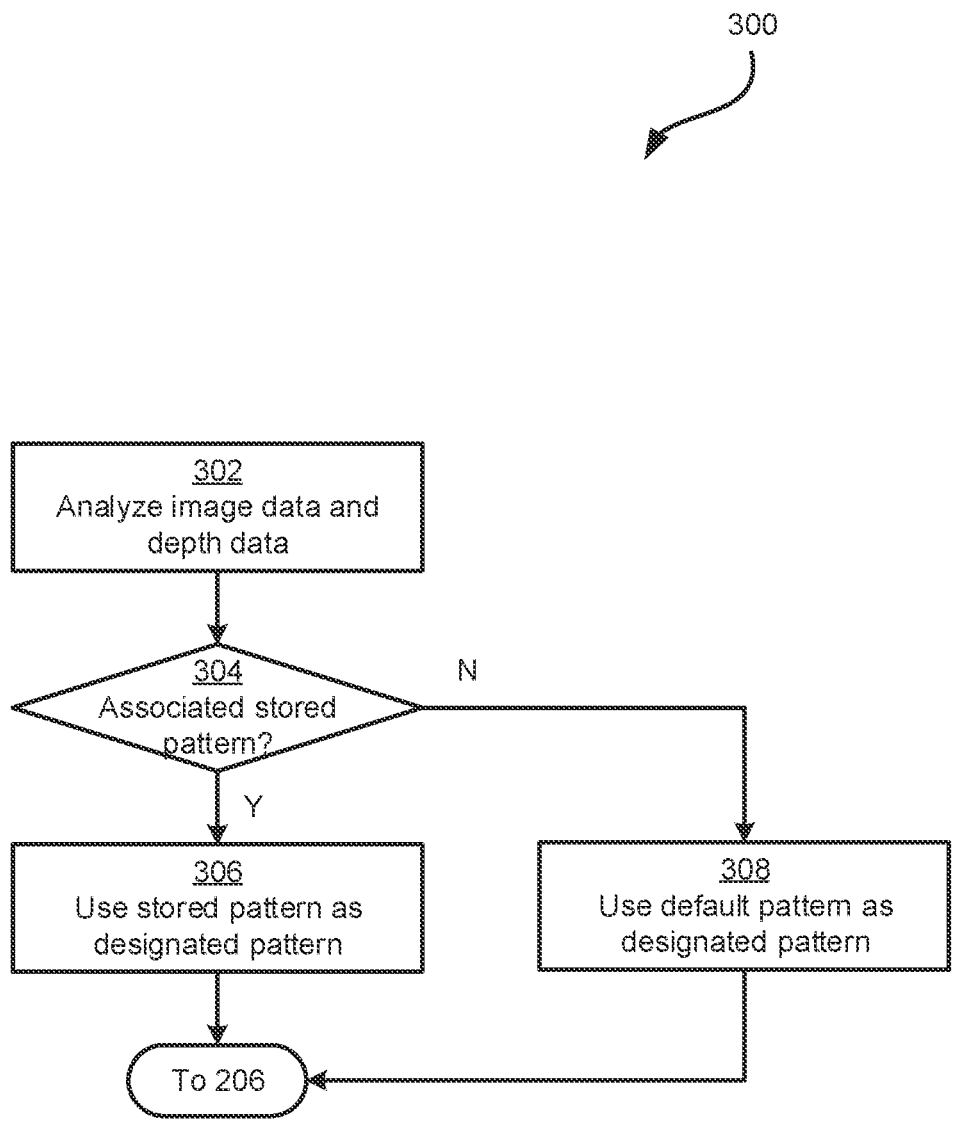
FIG. 3 is a flowchart of an example method of selecting a designated antenna pattern.

For example, referring to FIG. 3, a flowchart of an example method 300 of selecting a designated antenna pattern is depicted.

At block 302, the processor 108 analyzes the image data and the depth data. For example, when the processor 108 implements an artificial intelligence engine, the processor 108 may provide, to the artificial intelligence engine, the image data and the depth data as an input and obtain the output from the artificial intelligence engine.

In other examples, the processor 108 may compare the image data and the depth data to stored image data and depth data, representing previously captured environments of the device 100. The processor 108 may determine whether the image and depth data captured at block 202 is within a threshold similarity to the stored image and depth data. In particular, the processor 108 may identify the stored image and depth data having a highest similarity (e.g., as a weighted combination of the image data similarity and the depth data similarity) to the image and depth data captured at block 202.

At block 304, the processor 108 determines whether the image data and the depth data have a stored antenna pattern associated therewith, based on the results of the analysis at block 302.

For example, as a result of the analysis at block 302, the processor 108 may obtain a stored antenna pattern associated with the image data and the depth data, for example as the output of the artificial intelligence engine or stored in association with the stored image and depth data, resulting in an affirmative determination at block 304. In some examples, as a result of the analysis at block 302, the processor 108 may receive an indication that the image data and the depth data have no stored antenna pattern associated therewith, resulting in a negative determination at block 304.

In other examples, as a result of the analysis at block 302, the processor 108 may obtain a location of the device 100, for example as the output of the artificial intelligence engine or stored in association with the stored image data and depth data. At block 304, the processor 108 may then determine whether the location is recognized and has a stored antenna pattern associated with the location.

Figure 4:
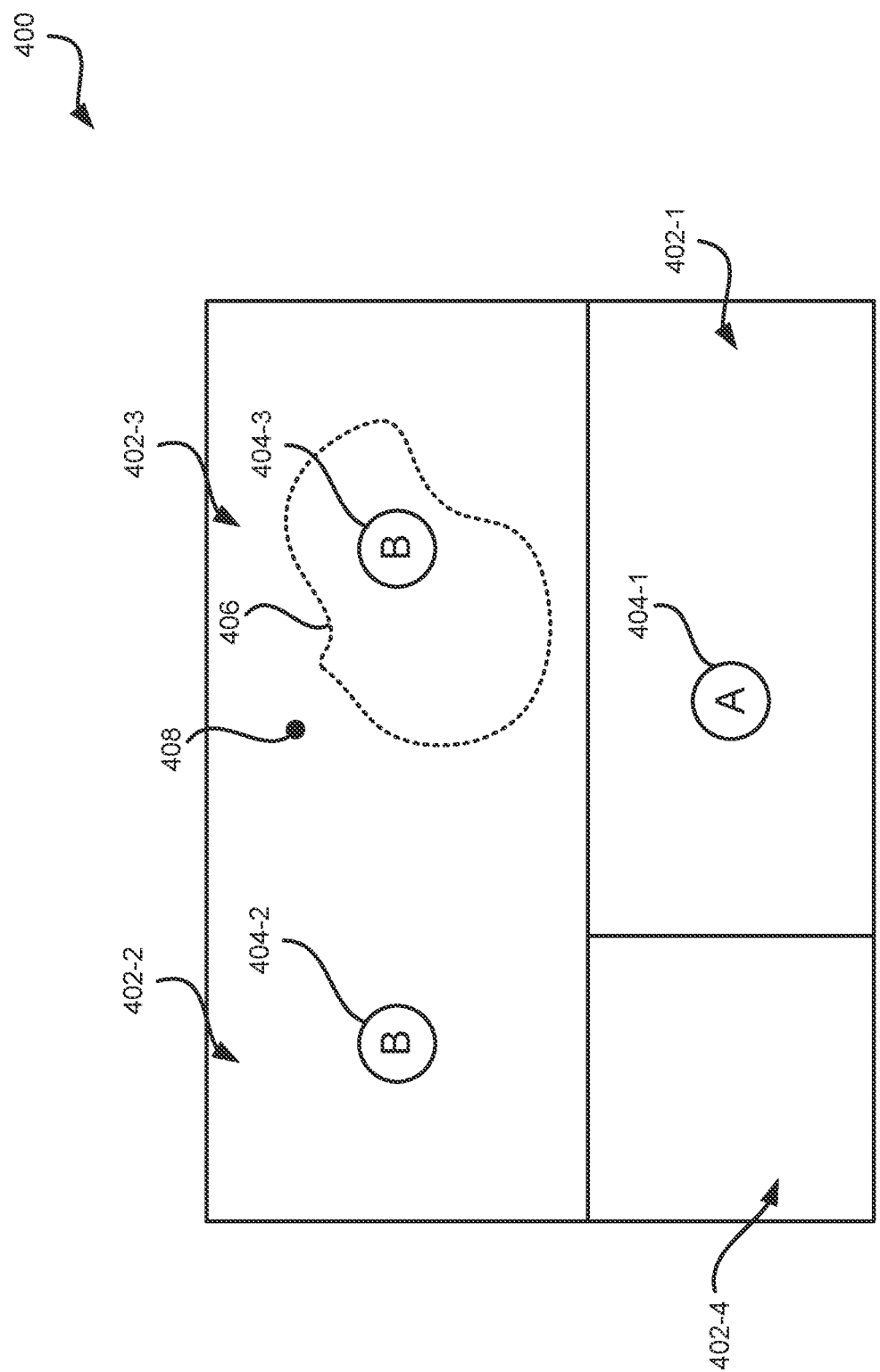
FIG. 4 is a schematic diagram of an example map associating antenna patterns to locations on the map for selecting antenna patterns based on image data and depth data.

For example, the device 100 may store a map of a space and stored antenna patterns associated with various specific locations or regions on the map. FIG. 4 depicts an example map 400 of an apartment having a bedroom 402-1, a kitchen 402-2, a living room 402-3, and a bathroom 402-4.

The map 400 may additionally define stored associations 404-1, 404-2, and 404-3 of antenna patterns with locations on the map 400. For example, the antenna patterns A, B, C, and D may be the radiation patterns which the antenna 102 is capable of producing. In the present example, the association 404-1 associates an antenna pattern A with the bedroom 402-1, while the associations 404-2 and 404-3 associate an antenna pattern B with the kitchen 402-2 and the living room 402-3, respectively. The associations 404 of rooms 402 with antenna patterns A, B, C, and D represent antenna patterns which, according to previous uses, provided the best performance (e.g., based on received signal strength, quality of channel including low latency, high throughput, and the like) at the location of the association 404.

In some examples, the associations 404 may more particularly be associated with a subregion of one of the rooms 402. For example, the association 404-3 may define, rather than an association with the entirety of the living room 402-3, an association of antenna pattern B with a region 406 of the living room 402-3. In particular, in some examples, the physical rooms 402 defined by structures and/or function according to a user's perspective, may not be explicitly defined in the map 400.

In one example, based on the image data and the depth data captured by the image sensor 104 and the depth sensor 106, the processor 108 may determine that the device 100 is located in the bedroom 402-1. Accordingly, the processor 108 may determine that an associated stored pattern exists, since the association 404-1 defines an association between the bedroom 402-1 (i.e., the room or region containing the location of the device 100) and antenna pattern A. That is, the processor 108 may select as the stored antenna pattern, the antenna pattern A associated with the region containing the location of the mobile computing device 100.

In another example, based on the image and depth data, the processor 108 may determine that the device 100 is located at point 408 in the living room 402-3. The processor 108 may determine whether the distance from the point 408 to the region 406 is within a threshold distance to determine whether the location of the device 100 has an associated stored antenna pattern, namely antenna pattern B. The processor 108 may then select the stored antenna pattern associated with a closest recognized location within the threshold distance. In some examples, the threshold distance may be zero; that is, the processor 108 may determine that the association 404-3 is valid only when the device 100 is located in the region 406. In still further examples, rather than comparing to a threshold distance, the processor 108 may simply identify the closest recognized location (i.e., the closest location for which an association 404 exists) and select the stored antenna pattern associated with the closest recognized location.

In still further examples, the processor 108 may track the locations of the physical rooms 402 and use the boundaries of the physical rooms 402 to filter associations. For example, based on the image data and depth data, the processor 108 may determine that the device 100 is located in the bathroom 402-4. Since no association 404 exists for the bathroom 402-4, the processor 108 may determine that no stored antenna pattern is associated with the image data and the depth data (or the location) rather than identifying the closest recognized location.

Other manners of defining associations between stored antenna patterns and image data and depth data and/or location are also contemplated.

Returning to FIG. 3, if the determination at block 304 is affirmative, that is there exists a stored antenna pattern associated with the image data and the depth data obtained at block 202, then the method 300 proceeds to block 306. At block 306, the processor 108 uses the stored antenna pattern as the designated antenna pattern and returns to block 206 of the method 200.

In some examples, there may be more than one stored antenna pattern associated with the image data and the depth data. For example, there may be multiple stored antenna patterns for different dates. In such examples, the processor 108 may select a most frequently identified stored antenna pattern, a most recently stored antenna pattern, or the like. In other examples, there may be multiple stored antenna patterns associated with different regions (e.g., the living room 402-3, or the region 406 more specifically) or slightly different locations (e.g., offset by one to two feet, but otherwise substantially represented by the same image data and depth data). In such examples, the processor 108 may select the stored antenna pattern having the closest matching location, or may also account for a most frequently and/or recently stored antenna, or the like.

If the determination at block 304 is negative, that is there does not exist a stored antenna pattern associated with the image data and the depth data obtained at block 202, then the method 300 proceeds to block 308. At block 308, the processor 108 uses a default antenna pattern as the designated antenna pattern and returns to block 206 of the method 200. The default antenna pattern may be selected at random or may be predefined and stored by the device 100.

Returning now to FIG. 2, after selecting the designated antenna pattern, at block 206, the processor 108 controls the antenna 102 to use the designated antenna pattern selected at block 204. Thus, the processor 108 may quickly select a designated antenna pattern to allow wireless communications for the device 100. In particular, when the designated antenna pattern is a stored antenna pattern selected based on historical data (i.e., in association with a recognized location or with previously stored image data and depth data), then the stored antenna pattern may be expected to perform at or above at least a threshold performance level. Thus, the device 100 may quickly connect for wireless communications with an expected robust quality without proceeding through a wait time to evaluate each of the plurality of antenna patterns which the antenna 102 is capable of generating.

Figure 5:
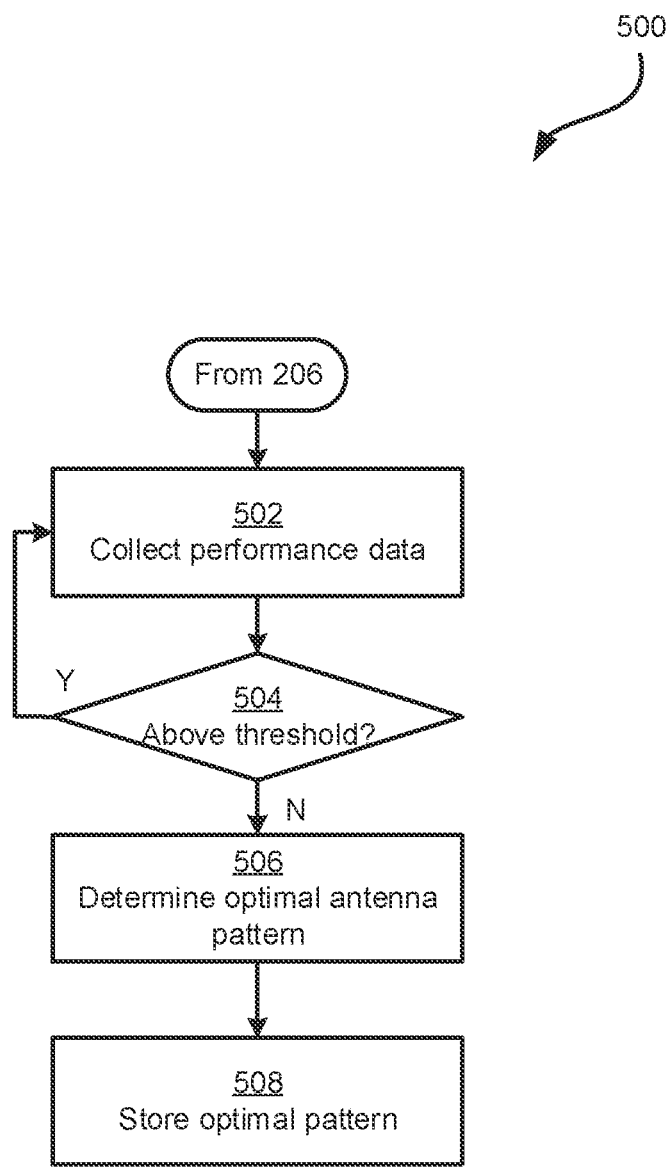
FIG. 5 is a flowchart of an example method of assessing a selected antenna pattern.

Further, the device 100 may still allow a reassessment of the antenna patterns, in particular when the designated antenna pattern is selected as a default antenna pattern. The device 100 may determine a new optimal antenna pattern and use the new optimal antenna pattern. For example, FIG. 5 depicts an example method 500 of assessing a selected antenna pattern.

At block 502, the processor 108 collects performance data for the antenna pattern generated by the antenna 102. For example, the processor 108 may evaluate the signal strength of a signal received from an access point or another connected device, the throughput or latency of communications, combinations of the above, or the like.

At block 504, the processor 108 compares the performance data collected at block 502 to a threshold. For example, the processor 108 may aggregate the performance data (e.g., via a weighted combination or the like) to obtain a single score and determine whether the score is above a threshold score. In other examples, the processor 108 may compare each obtained performance metric to a respective threshold and evaluate the performance data based on the number or proportion of metrics which pass their respective thresholds.

When the determination at block 504 is affirmative, that is, the performance data exceeds the threshold, then the method 500 returns to block 502 to continue collecting and evaluating performance data.

When the determination at block 504 is negative, that is, the performance data is below the threshold, then the method 500 proceeds to block 506. At block 506, the processor 108 determines an optimal antenna pattern from the plurality of antenna patterns. For example, the processor 108 may control the antenna 102 to iterate through each of the antenna patterns, collect performance data on each of the antenna patterns, and identify the antenna pattern producing the best performance data (e.g., highest throughput, lowest latency, combinations thereof, and the like).

At block 508, the processor 108 stores the optimal antenna pattern in association with the image data and the depth data. For example, when the designated antenna pattern was selected as a previously stored antenna pattern, the processor 108 may update and/or add to a log, the optimal antenna pattern selected at block 506 in association with the image data and depth data and/or in association with the location defined by the image data and the depth data. In other examples, for example if the image data and depth data define a slightly different location than one previously stored, the processor 108 may define locations more granularly to obtain a more detailed map of the optimal antenna pattern for each region of a space. In other examples, when the designated antenna pattern was selected as the default antenna pattern, the processor 108 may simply associate the optimal antenna pattern to the location and/or image and depth data.

Additionally, at block 508, the processor 108 may control the antenna 102 to use the selected optimal antenna pattern.

As described above, an example mobile computing device may have an active steering antenna capable of switching between multiple antenna patterns. The mobile computing device has an image sensor and a depth sensor (e.g., a time-of-flight sensor) to capture data representing the environment of the device. This data can be used by an AI engine to determine a location of the device, and to determine a designated antenna pattern for that location, which historically has provided good performance. In some examples, the AI engine may select the designated antenna pattern directly from the image data and the depth data rather than particularly identifying a location. The device can also re-evaluate the antenna performance to determine if a new antenna pattern should be associated with that location and/or image and depth data. Thus, the environment can be used to quickly select a designated pattern known to perform well, without a wait time to evaluate each of the antenna patterns, while still allowing for reassessment of the antenna patterns.

The scope of the claims should not be limited by the above examples but should be given the broadest interpretation consistent with the description as a whole.

The invention claimed is:

1. A mobile computing device comprising:
an antenna capable of switching between a plurality of antenna patterns;
an image sensor to capture image data representing an environment of the mobile computing device;
a depth sensor to capture depth data representing the environment of the mobile computing device;
a processor connected to the antenna, the image sensor and the depth sensor, the processor to:
obtain the image data and the depth data;
select a designated antenna pattern from the plurality of antenna patterns based on the image data and the depth data; and
control the antenna to use the designated antenna pattern.

2. The mobile computing device of claim 1, wherein to select the designated antenna pattern, the processor is to:
determine a location of the mobile computing device based on the image data and the depth data; and
when the location is recognized, retrieve a stored antenna pattern associated with the location to be used as the designated antenna pattern.

3. The mobile computing device of claim 2, wherein, when the location is not recognized, the processor is to select a default antenna pattern to be used as the designated antenna pattern.

4. The mobile computing device of claim 2, wherein, when the location is not recognized, the processor is to:
determine an optimal antenna pattern from the plurality of antenna patterns; and
store the optimal antenna pattern as the stored antenna pattern associated with the location.

5. The mobile computing device of claim 1, wherein the processor is further to:
collect performance data for the designated antenna pattern;
when the performance data is below a threshold level, determining an optimal antenna pattern from the plurality of antenna patterns; and
store the optimal antenna pattern in association with the image data and the depth data.

6. The mobile computing device of claim 1, wherein the processor is to implement an artificial intelligence engine to select the designated antenna pattern based on the image data and the depth data.

7. The mobile computing device of claim 1, wherein the processor is to obtain the image data and the depth data in response to a triggering event comprising one of: a request for connection to a network; detection of a change in location of the mobile computing device; detection of a change in signal strength; and a combination thereof.

8. A mobile computing device comprising:
an antenna capable of switching between a plurality of antenna patterns;
an image sensor to capture image data representing an environment of the mobile computing device;
a depth sensor to capture depth data representing the environment of the mobile computing device;
a processor connected to the antenna, the image sensor and the depth sensor, the processor to:
obtain the image data and the depth data;
determine a location of the mobile computing device based on the image data and the depth data;
retrieve a stored antenna pattern associated with the location; and
control the antenna to use the stored antenna pattern.

9. The mobile computing device of claim 8, wherein to retrieve the stored antenna pattern associated with the location, the processor is to select, as the stored antenna pattern, an antenna pattern associated with a region containing the location of the mobile computing device.

10. The mobile computing device of claim 8, wherein to retrieve the stored antenna pattern, the processor is to select, as the stored antenna pattern, an antenna pattern associated with a recognized location closest to the location of the mobile computing device, when the recognized location is within a threshold distance.

11. The mobile computing device of claim 8, wherein to retrieve the stored antenna pattern, the processor is to select, as the stored antenna pattern, an antenna pattern associated with a recognized location closest to the location of the mobile computing device.

12. The mobile computing device of claim 8, wherein, when no stored antenna pattern is associated with the location, the processor is to select a default antenna pattern comprising one of: a randomly selected antenna pattern of the plurality of antenna patterns and a predefined antenna of the plurality of antenna patterns.

13. The mobile computing device of claim 8, wherein to retrieve the stored antenna pattern, the processor is to select one of: a most recently stored antenna pattern; a most frequently identified stored antenna pattern; and a stored antenna pattern associated with a closest location to the location of the mobile computing device.

14. A method comprising:
obtaining image data and depth data representing an environment of a mobile computing device;
selecting, based on the image data and the depth data, a designated antenna pattern;
controlling an antenna of the mobile computing device to use the designated antenna pattern for wireless communications;
collecting performance data for the designated antenna pattern; and
when the performance data is below a threshold:
determining a new optimal antenna pattern; and
storing the new optimal antenna pattern in association with the image data and the depth data.

15. The method of claim 14, wherein selecting the designated antenna pattern comprises:
determining a location defined by the image data and the depth data; and
retrieving a stored antenna pattern associated with the location as the designated antenna pattern.

* * * * *